United States Patent
Funderburk

(10) Patent No.: US 9,274,669 B1
(45) Date of Patent: Mar. 1, 2016

(54) CUSTOMIZING USER INTERFACES FOR MULTIPLE DIFFERENT CLIENTS

(75) Inventor: Max H. Funderburk, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 530 days.

(21) Appl. No.: 12/763,116

(22) Filed: Apr. 19, 2010

(51) Int. Cl.
*G06F 3/0481* (2013.01)

(52) U.S. Cl.
CPC .................................... *G06F 3/0481* (2013.01)

(58) Field of Classification Search
None
See application file for complete search history.

(56) References Cited

U.S. PATENT DOCUMENTS

| | | | |
|---|---|---|---|
| 7,509,374 B2* | 3/2009 | Trinh et al. | 709/203 |
| 7,864,186 B2* | 1/2011 | Robotham et al. | 345/581 |
| 8,112,714 B2* | 2/2012 | Fleishman et al. | 715/744 |
| 2003/0191799 A1* | 10/2003 | Araujo et al. | 709/203 |
| 2005/0188318 A1* | 8/2005 | Tamir et al. | 715/744 |
| 2009/0296739 A1* | 12/2009 | Sakai et al. | 370/474 |
| 2010/0174671 A1* | 7/2010 | Brooks et al. | 706/12 |
| 2010/0180205 A1* | 7/2010 | Deshpande et al. | 715/744 |
| 2011/0131330 A1* | 6/2011 | Beaty et al. | 709/227 |

\* cited by examiner

*Primary Examiner* — Matt Kim
*Assistant Examiner* — Tuan Nguyen
(74) *Attorney, Agent, or Firm* — Lee & Hayes, PLLC

(57) ABSTRACT

Techniques described herein provide customized user interfaces to users of clients based on the context of the client. For instance, the techniques may receive parameters that relate to specific client contexts, may transmit the parameters to a content scheduler, and may receive a schedule for serving context-specific user interface to the users. In response to receiving the content schedule, the techniques serve the context-specific content in scheduled locations of the customized user interface to the user.

33 Claims, 7 Drawing Sheets

CUSTOMIZING USER INTERFACES FOR MULTIPLE DIFFERENT CLIENTS

BACKGROUND

A Web application host may comprise multiple Web application clients, each of which may provide a different service to users of the client. As such, each client may uniquely design or brand the user interfaces that the client serves to its users. Additionally, when accessing such Web application clients, users may be required to authenticate themselves. For instance, a user attempting to access a Web application client, such as an on-line marketplace, may be presented with a customer authentication screen requesting a user identifier (ID) and a password. As such, each Web application client may be configured to present its own specific authentication screen with branded content, as discussed above.

However, in order to maintain the unique design or brand of these users interfaces, such as these authentication pages, each client maintains the underlying functionality of these interfaces. For instance, these clients may maintain the functionality of the client's authentication screen to allow users to authenticate themselves. However, if the host requires that each client update the respective authentication process, security requirements, and the like, each individual Web application client must be updated individually in order to comply with even simple changes. Unfortunately, this results in a long, drawn-out and highly duplicative process to carry out a simple security change.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 3 illustrates an example where no content is assigned, while FIG. 4 illustrates an example where some slots contain context-specific content.

DETAILED DESCRIPTION

Overview

Figure 1:
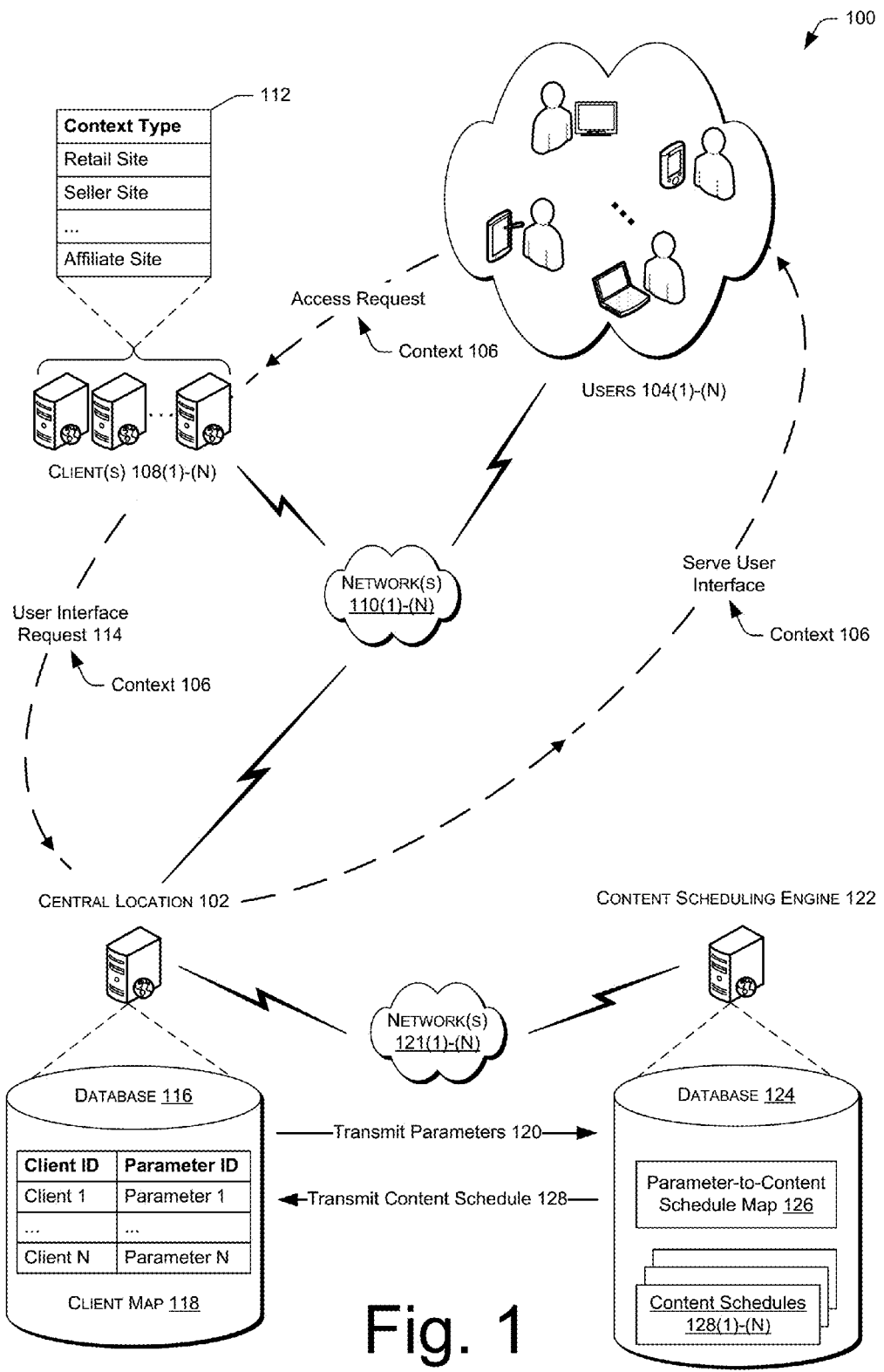
FIG. 1 illustrates an example architecture that includes a central location that maintains a service for multiple different clients while customizing user interfaces for the service used by the respective clients. The central location receives requests for the user interfaces from each of multiple different clients and, in response, a content scheduling engine may determine specific content to insert into the user interface based on the context of the requesting client.

This disclosure is directed, in part, to techniques for dynamically customizing a user interface with context-specific content for a multitude of clients. By doing so, the techniques allow for the functionality of a service to be managed at a central location, while still allowing different clients to present user interfaces in a custom and unique manner to their respective users. For instance, a central location made up of at least one server may maintain functionality for an authentication service, an address management service, or any other similar or different service that may be utilized by multiple different clients of the central location.

Therefore, when a user of a first client requests to authenticate with the first client, the first client may request a log-in page from the central location server. The central location server may provide the log-in page in a manner that is customized for the first client. For instance the log-in page may include a design that is custom to the client of the central location server. The custom design may include a brand of the client, colors or fonts designated by the client, different functionality, and the like.

Similarly, when a user of a second, different client makes a request to authenticate with the second client, the second client may also send a request for the log-in page to the central location server. Here, however, the central location server may customize the log-in page for the second client. For instance, the central location server may fill the log-in page with content and the like designated by the second client. As such, the techniques described below allow for centralization of a service, while customizing the user interfaces of the underlying service for different requesting clients. Therefore, the central location server is able to maintain and update functionality of the service (e.g., security features, etc.), while still allowing different clients to customize (e.g., brand, etc.) the look and feel of these services.

In some instances, a customized user interface in the form of a Web page may be served to a Web user by a central location server, such as an authentication server that communicates with a content scheduling engine. The authentication server maintains a log-in service for multiple different clients that each allows users to authenticate prior to interacting with the respective client. For instance, the authentication server may receive a request for a user interface (UI) from a client and may serve a content-specific UI to the user based on a content schedule determined from a content scheduling engine. The content schedule may define the content served within the UI, as discussed above. Additionally, the authentication server and the content scheduling engine may be servers for the respective clients.

With these techniques, in one example a client may store context-specific content as part of a content schedule of a content scheduling engine. An authentication server may then access this content schedule in response to receiving a UI request from a client. This request may be in response to a user attempting to log-in to, or log-out of, the client. Additionally or alternatively, this request may also occur in response to a user attempting to access any type of content from a client. In one example, the authentication server may communicate with an external content scheduling engine. For instance, the authentication server may transmit parameters that identify the client, the context, the user, and/or other particular information to the content scheduling engine. Based on a parameter-to-content-schedule map, the content scheduling engine may then respond by transmitting the appropriate content schedule back to the authentication server. The authentication server may then serve a context-specific UI to the client and/or the user of the client.

The parameter-to-content-schedule map may be used to determine the content schedule mapped to the parameter that was transmitted by the authentication server. For instance, a first parameter identifying a first client may determine a content schedule unique to the first client, while a second parameter identifying a second parameter may determine a content schedule unique to the second client. The content schedule, meanwhile, may be implemented as a slot-to-content mapping, which may be used by the authentication server to determine the identity of the content to display, as well as the locations within the UI to display such content. A UI that is common for the multiple clients that request the UI may be used as a shell containing slots that correlate to specific locations on the UI. Thus, the content schedule in combination with the common UI may determine which content is displayed in which slots of the UI.

In some instances, the authentication server may operate with an integrated content scheduling engine. In these instances, the authentication server may receive a UI request from a client and, based on the parameters received, may determine the context-specific content to display based on a content schedule stored locally. In this instance, the authentication server may act as the content scheduling engine and may be configured to provide content schedules for additional clients not previously used within the architecture. For instance, the authentication server may be configured to provide custom user interfaces to non-affiliated clients.

In still other instances, the authentication server may be accessible by Web clients over a public or private network. Additionally, the content scheduling engine may be accessible by the authentication server over a network. In these instances, users may access Web clients over a network such as the Internet.

The techniques described above and below may be implemented in a number of ways and in a number of contexts. Several example implementations and contexts are provided with reference to the following figures, as described below in more detail. However, the following implementations and contexts are but a few of many.

Illustrative Architectures

FIG. 1 illustrates an example architecture 100 in which a central location server 102 serves context-specific UIs to users 104(1)-(N) based on a context 106 between the users 104(1)-(N), one of a multitude of possible clients 108(1)-(N), and the central location server 102. For instance, the central location server 102 may maintain and update the functionality of an underlying service for users of multiple different clients. When a user requests access to a particular client, the client sends a request to the central location server 102 for a user interface on behalf of the user. In response, the central location serves, to the user, a user interface that is customized to the particular context. As such, the central location server 102 is able to maintain the functionality of the service associated with the user interface, while still customizing the interface for multiple different clients.

In one example, a user 104 accesses a client 108 over one or more networks 110(1)-(N). Additionally, the central location server 102 may also be accessible over the one or more networks 110(1)-(N). In one instance, the clients 108(1)-(N) may comprise Web applications hosted by a common Web service provider or by differing Web service providers. As illustrated, a user 104 may be someone using a personal computing device, a laptop, a tablet computing device, a cellular telephone, an e-book reader device, or any other device capable of accessing one or more Web clients 108(1)-(N). Additionally and as illustrated, the context 106 of the context-specific UI may be based on a context type 112 of the client 108, which may be based on whether the client 108 is a retail site, a seller site, an affiliate site, combinations thereof, or the like.

Clients 108(1)-(N) may request that users 104(1)-(N) of the service authenticate by, for example, providing a user name and password or the like. In this example, the central location server 102 may maintain the sign-in functionality for multiple different clients 108(1)-(N), while customizing the look and feel of the served sign-in pages for each particular client. However, these techniques may also apply to any other instance where a central location maintains a service for multiple different clients.

In the authentication example, a client 108 may transmit a UI request 114 to a central location server 102 in lieu of providing its own authentication page. As discussed above, this may facilitate more efficient and effective updating of the authentication and/or customization system. The UI request 114 may contain parameters based on the context type 112 and/or the user 104 who is attempting to access the client 108.

In one instance, the UI request 114 may contain an association handle identifying the client making the UI request 114. In other words, the association handle may be a client identifier (ID) or a context ID. Alternatively, the association handle may be used to identify the user 104 who is accessing the client 108.

In some instances, the central location server 102 may determine additional parameters associated with a client ID (or context ID) based on the received association handle. For example, each client ID may be mapped to several other identifiers, such as a marketplace ID, a page ID, a slot ID, or the like. Additionally, the central location server 102 may store or otherwise have access to a database 116 that stores a client-to-parameter map 118, which may be configured to store the mapping between the associated parameters and each client ID.

In the illustration, the central location server 102 may transmit parameters 120 over one or more networks 121(1)-(N) to a content scheduling engine 122. As noted above, the content scheduling engine 122 may be a server similar to that used to implement the central location server 102. Additionally, the one or more networks 121(1)-(N) that may connect the central location server 102 and the content scheduling engine 122 may differ from the one or more networks 110(1)-)(N) that connect a user 104, a client 108, and the central location server 102. In this way, users 104(1)-(N) may not have access to the content scheduling engine 122 directly. The parameters 120 may comprise the association handle, any of the other identifiers listed above, or combinations thereof. The content scheduling engine 122 may store or otherwise have access to a database 124 that stores a parameter-to-content-schedule map (or simply, a "parameter map") 126 and one or more content schedules 128(1)-(N). The parameter map 126 may be used for determining which content schedule 128 is associated with which transmitted parameter(s) 120. A content schedule 128 may comprise a content-to-slot map which indicates which context-specific content are to be displayed in which slots of the UI.

In response to receiving a set of one or more parameters 120, and based on the parameter map 126, the content scheduling engine 120 may transmit the content schedule 128 to the central location server 102. In this instance, the central location server 102 may then serve the context-specific UI based on the content schedule 128. For example, the central location server 102 may insert the specified content at the specified slot locations and provide the UI to the client 108 that made the UI request 114. Or, the central location server 102 may serve the context-specific UI by providing the UI and the indications of the content to the client 108 that made the UI request 114. In the latter instances, the client 108 may itself access the content and insert the content into the specified slots.

In another instance, the content scheduling engine 122 may be integrated with the central location server 102. In this instance, the central location server 102 may not transmit parameters 120 to a remote content scheduling engine 122 because the parameter map 126 and the content schedules 128(1)-(N) are stored locally along with the client map 118.

In yet another instance, the central location server 102 may be configured to receive multiple parameters in the UI request 114. In this instance, the central location server 102 may store more than one client ID per client 108. Based on the parameters received in the UI request 114, the central location server 102 may determine which of multiple client IDs to transmit as parameters 120 to the content scheduling engine 122. In this way, more than one content schedule 128 may be mapped to one client, thus allowing additional customization.

Figure 2:
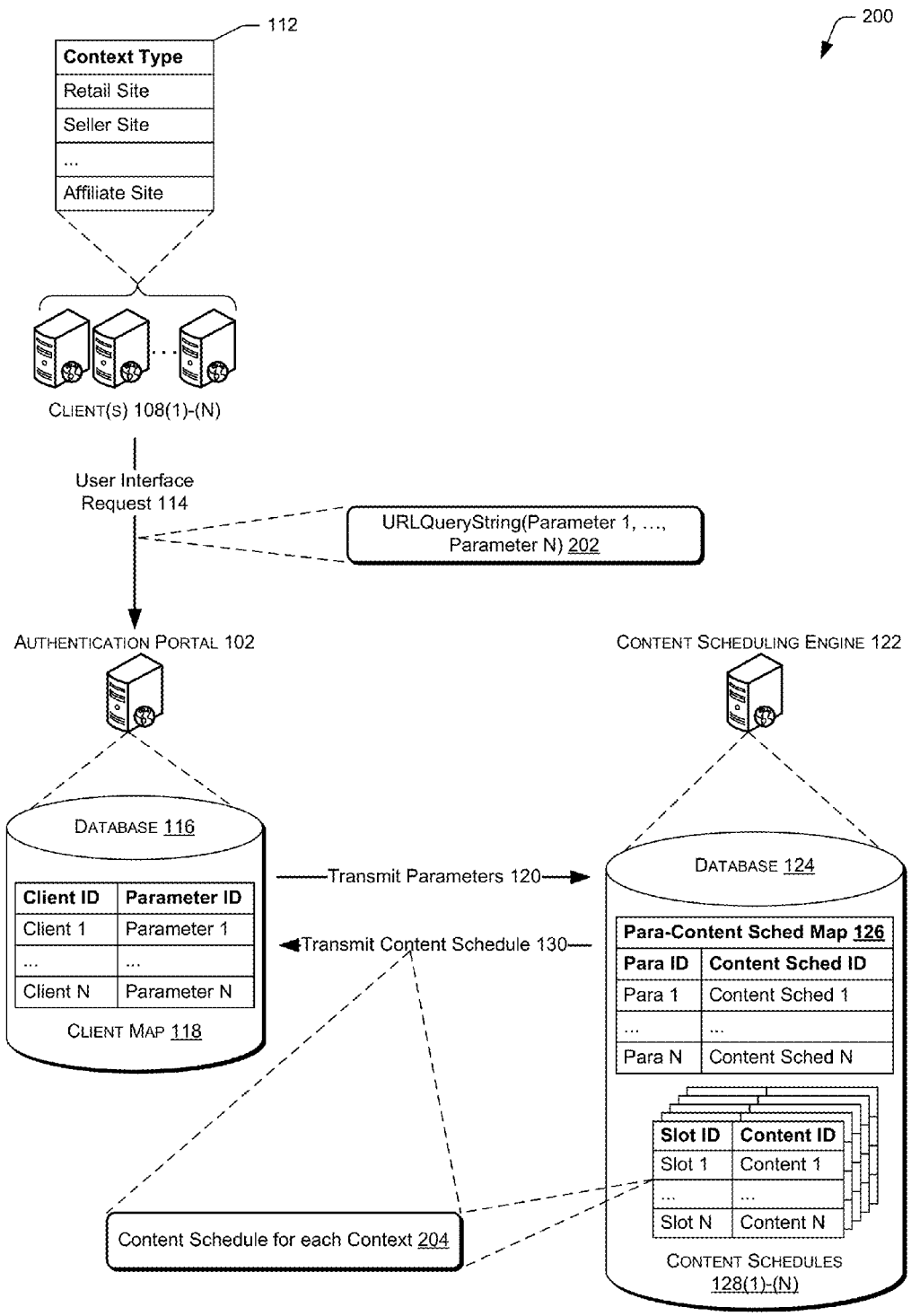
FIG. 2 illustrates an example transaction between the central location and the content scheduling engine of FIG. 1. This figure illustrates that the central location and the content scheduling engine may determine and transfer data based on mappings.

FIG. 2 illustrates an example architecture 200 and example transaction between a client 108, a central location server 102, and a content scheduling engine 122 within the architecture 200. In one instance, the central location server 102 may receive a UI request 114 from a client 108 in the form of a uniform resource locator (URL) query string 202. For example, the request 114 may be a URL such as http://www.site.com/AB/signin?parameter1,parameter2. In this instance, www.site.com may signify the host of the central location server 102, "/AB" may signify the name of the content scheduling engine 122, "/signin?" may signify the type of customized page being requested by the client 108, and "parameter1" and "parmeter2" may be the respective parameters associated with the client 108. In response to the UI request 114, the central location server 102 may transmit the parameters 120 found in the URL query string 202 to the content scheduling engine 122. Alternatively, one parameter, such as an association handle, or more than two parameters maybe transmitted to the content scheduling engine 122.

As noted above, the content scheduling engine 122 may contain a parameter-to-content-schedule map (parameter map) 126 which may determine which content schedule 128 to transmit 130 back to the central location server 102. In one instance, each parameter may be mapped to one content schedule 128. In yet another instance, each parameter may be mapped to multiple ones of the content schedules 128(1)-(N). In this instance, the additional parameters of the transmission 120 may be used to determine which content schedule 128 is being requested.

In response to the parameter transmission 120, the content scheduling engine 122 may transmit 130 the appropriate content schedule 128 to the central location server 102. The transmitted content schedule 128 may comprise of a mapping between UI slots and context-specific content. For example, each slot corresponding to a location in the UI may be numbered from 1 to N. Additionally, each element of context-specific content may be numbered 1 to N as well. Thus, the transmitted content schedule 128 corresponding to the transmitted parameter(s) 120 maps what content belongs in which slot locations of the context-specific UI to be served to the user 104 by the central location.

In one instance, the content scheduling engine 122 may be configured with a calendar and/or clock function. In this instance, time-of-day content may be scheduled by the content scheduling engine 122 as well. For example, if requested by a client, time-of-day information could be scheduled to be rendered in a slot (or location) of the UI to further customize the experience.

In another instance, one of the transmitted parameters 120 may comprise a request for the display of user information or a field in which a user may provide information, such as name, user ID, nickname, user image, combinations thereof, or the like. In this instance, the content scheduling engine 122 may schedule such content to be mapped to a particular slot. In this way, the central location server 102 may then render and/or provide the user-specific content in the UI to even further customize the experience.

In yet another instance, the context-specific content may be stored locally in the memory of the central location server 102. That is, the central location server 102 may contain the client map 118, the context-specific content for each client 104, and the logic to implement the described functionality within its local memory.

Illustrative User Interfaces

Figure 3:
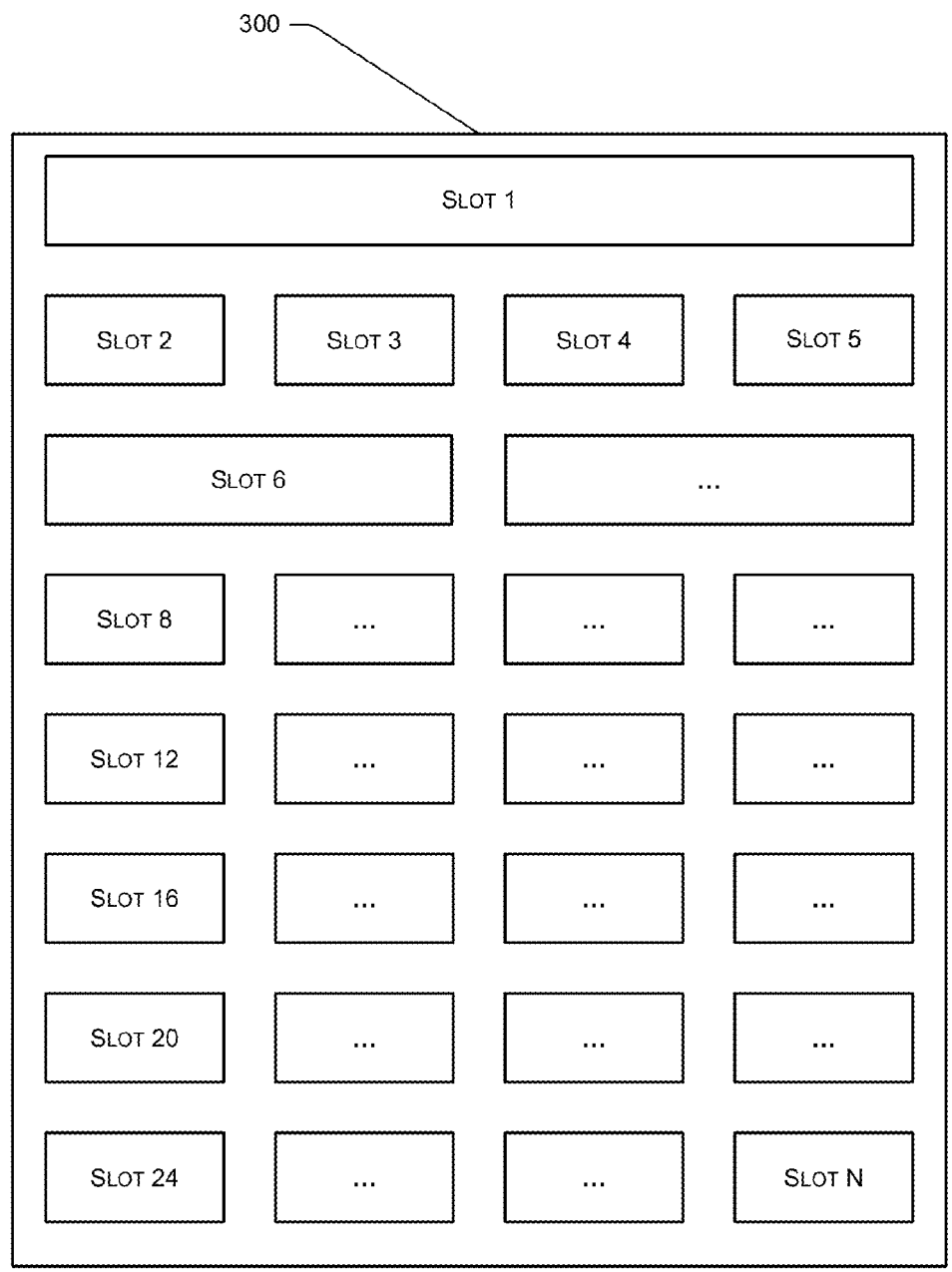
FIGS. 3-4 illustrate an example user interface with slots indicating locations for context-specific content. Here.
Figure 4:
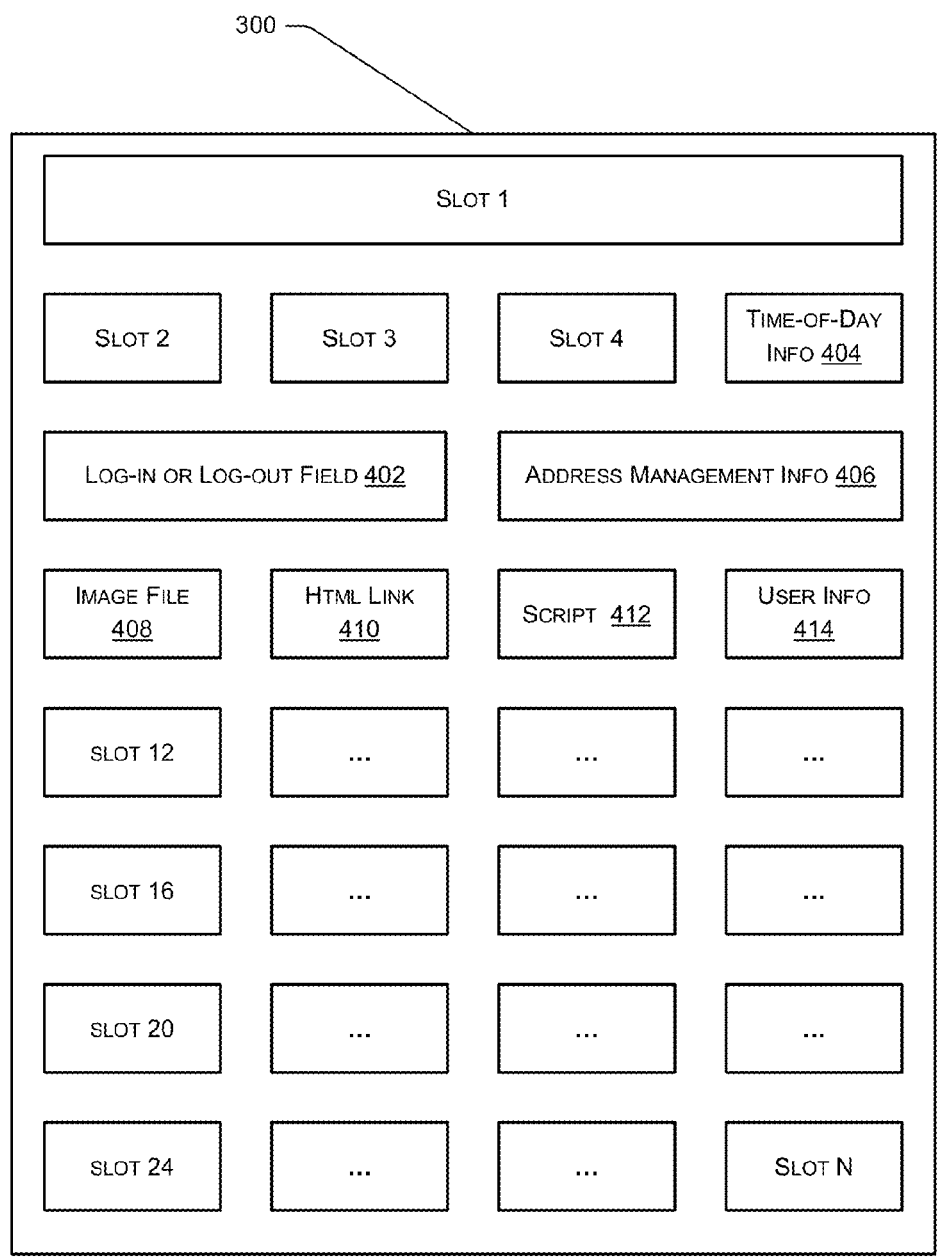

FIGS. 3-4 illustrate an example skeleton of a UI 300 that may be served to users and customized for multiple different clients, based on the context. As noted above, a central location server 102 may insert the context-specific content in specified slots of the UI. In one instance, a skeleton UI may be used with specified slots in pre-designated locations. As shown with UI 300, a skeleton UI may comprise slots 1 to N, possibly of different sizes. By way of example and not limitation, UI 300 illustrates one of many different configurations of slots. In yet another instance, the slots, numbered 1 to N, may correspond to the slot numbers in the content schedules 128(1)-(N) of the content scheduling engine 122.

In one instance, as shown in FIG. 4, UI 300 may comprise a dedicated log-in and/or log-out slot. In this example, slot 6 of FIG. 3 has been assigned the static location for the authentication function which may comprise user ID and password text fields.

The example UI 300 of FIG. 4 further illustrates time-of-day information 404 in slot 5 (of FIG. 3), address management information 406 in slot 7, an image file in slot 8, a hypertext markup language (HTML) link 410 in slot 9, an object-oriented language script 412 in slot 10, and user information 414 in slot 11. In this instance, the context-specific, and/or user-specific content may have been scheduled to be rendered in the listed slots by the content schedule 128 of the content scheduling engine 122. For example, the content schedule 204 of transmission 130 (of FIG. 2) may have mapped each of the shown slots to the above elements. In this way, the central location server 102 may render the content in the slots indicated by the content schedule 204. Alternatively, more, less, or different content altogether may be displayed in any of the slots of the UI 300.

Illustrative Computing Device

Figure 5:
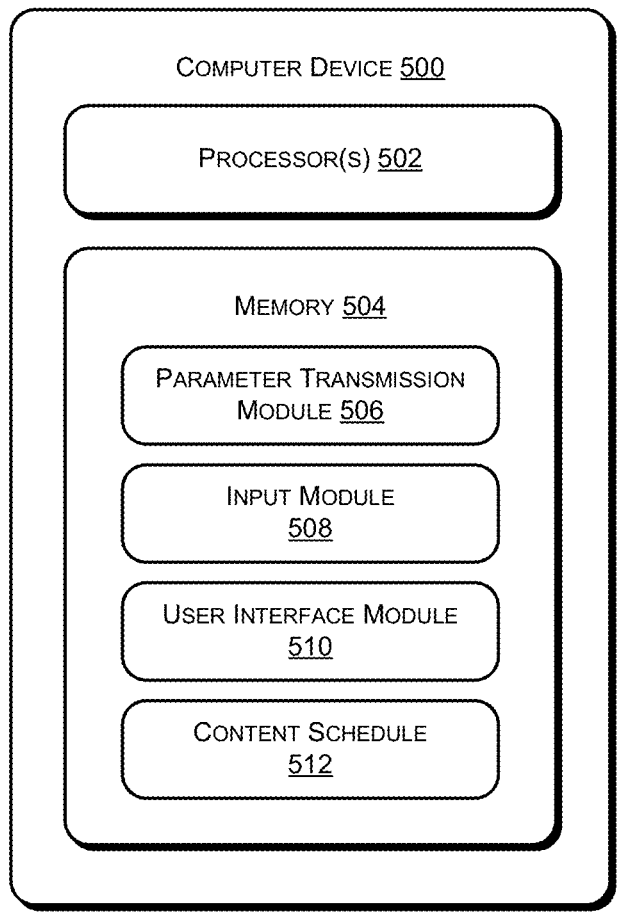
FIG. 5 illustrates an example computing device capable of implementing the techniques discussed above with reference to the architecture shown in FIG. 1.

FIG. 5 illustrates an example computing device 500 that might be configured to implement the functions and features of the central location for customizing a user interface, as described above. In a very basic configuration, the computing device 500 may include one or more processors 502, and memory 504. Depending on the configuration of the computing device 500, the memory 504 is an example of computer storage media and may include volatile and nonvolatile memory. Thus, the memory 504 may include, but is not limited to, RAM, ROM, EEPROM, flash memory, or other memory technology, or any other medium which can be used to store media items or applications and data which can be accessed by the computing device 500.

The memory 504 may be used to store any number of functional components that are executable on the processor(s) 502, as well as data and content items that are rendered by the computing device 500. Thus, the memory 504 may store an operating system (not shown) and several modules containing logic.

A parameter transmission module 506 may also be provided in memory 504 and executed on the processor(s) 502 to facilitate transmission of parameters, such as an association handle, to a content scheduling engine. The parameter transmission module 506 may provide the parameters to the content scheduling engine in a URL query string as described above. In another instance, the parameter transmission module 506 may be configured to transmit the parameters in another fashion, such as in a function call.

The memory 504 may further store an input module 508 to receive a content schedule from the content scheduling engine in response to the transmitted parameters. The input module 508 may also be executable on the processor(s) 502 and may be configured to receive input from clients as well. Thus, the input module may be configured to receive parameters from affiliated and/or non-affiliated clients in the form of UI requests as, well as to receive content schedules from one or more content scheduling engines.

A user interface (UI) module 510 may also be provided in memory 504 and executed on the processor(s) 502 to facilitate user operation of the client applications. In one instance, the UI module 510 may present an authentication page to a user seeking to log-in to a client application. In another instance, the UI module 510 may present a log-out page or an address management page. In yet another instance, the UI module 510 may be configured to render image files, HTML links, object-oriented scripting language code (scripts), and/or user-specific information to the user.

The computing device 500, in one configuration, may also include a content schedule stored in the memory 504 responsible for listing a mapping between UI slots and context-specific and/or user-specific content. In this instance, the content schedule 512 may be stored locally within the memory of the central location rather than being received from a remote content scheduling engine. In other words, the content scheduling engine may be integrated with the central location (e.g., the authentication) portal such that the content schedules are stored locally in memory.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Illustrative Processes

Figure 6:
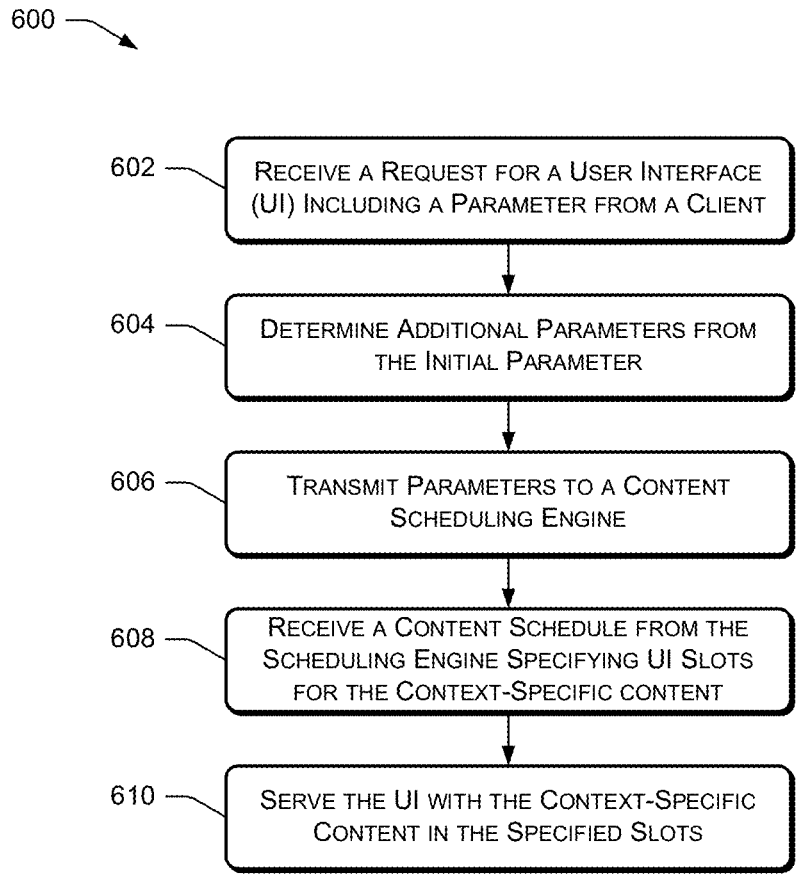
FIG. 6 illustrates an example flow diagram of a process for implementing a central location that maintains a service for multiple different clients while customizing user interfaces for these clients. Here, the central location communicates with an external or an integrated content scheduler to serve context-specific content in slots of a user interface to customize the user interface for a requesting client.
Figure 7:
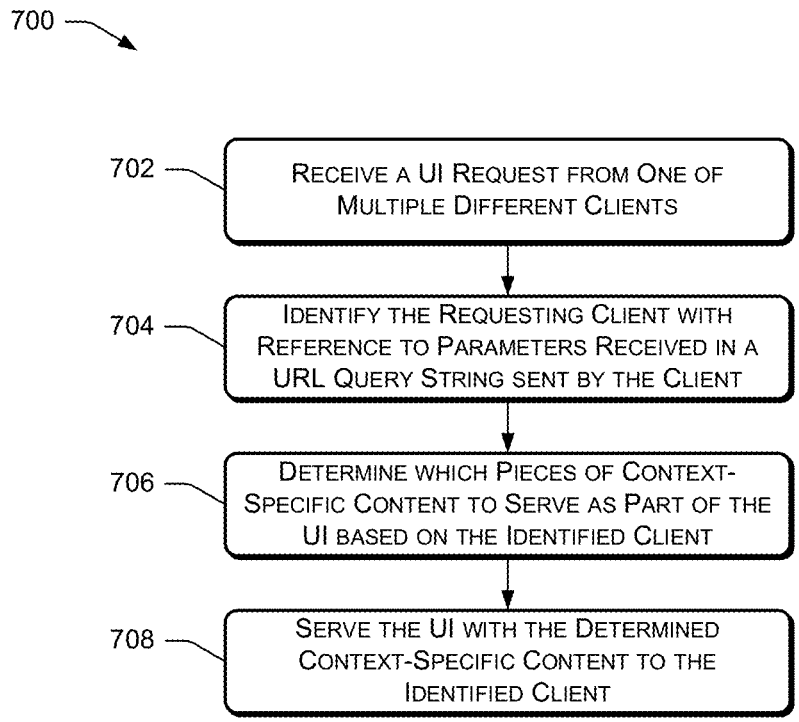
FIG. 7 illustrates an example flow diagram of a process determining context-specific content to display in a user interface for a particular client.

FIGS. 6-7 illustrate example flow diagrams of processes 600 and 700 for implementing a central location for maintaining a service for multiple different clients while customizing user interfaces associated with this service and sent to the clients, as discussed above.

The process 600 includes the central location server 102 receiving initial parameters from a client 106 in a UI request at 602. At 604, the central location server 102 determines additional parameters related to the client 108 from the initial parameters received in the UI request. At 606, the central location server 102 transmits the parameters (the initial parameters, the additional parameters, or combinations of both) to the content scheduling engine 122. At 608, the central location server 102 receives a content schedule 128 from the scheduling engine 122 specifying which content to insert into the UI and which slots to insert this content into. At 610, the central location server 102 serves the context-specific UI with the context-specific content in the specified slots to the user 104 of the client 106. The process 600 may be implemented when the content scheduling engine 122 is available over a network and/or integrated with the central location server 102.

FIG. 7 illustrates a process 700 where clients make UI requests with URL query strings, as in the case of Web service calls to the central location server 102. The process 700 includes the central location server 102 receiving a UI request from one of multiple different clients 108 at 702. At 704, the central location server 102 identifies the requesting client 108 with reference to parameters received in a URL query string sent by the client 108. At 706, the central location server 102 determines which pieces of context-specific content to serve as part of the customized UI based on the identified client 108. At 708, the central location server 102 serves the UI with the determined context-specific content to the identified client 108. For instance, the UI may comprise a log-in page or any other page that is customized (e.g., branded, etc.) for the requesting client. This process thus allows for centralization of a service (e.g., authentication) while still allowing for customization of the user interfaces associated with this service.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. One or more non-transitory computer storage media storing computer-executable instructions that, when executed, cause one or more processors to perform acts comprising:

maintaining context-specific content in memory for populating various combinations of the context-specific content within slots of a first user interface based at least in part on a context of a first web host that requests the first user interface;

receiving, at an authentication server, (i) a first plurality of requests for a corresponding first plurality of user interfaces from the first web host in response to a corresponding first plurality of user computing devices attempting to access content from the first web host and (ii) a second plurality of requests for a corresponding second plurality of user interfaces from a second web host in response to a corresponding second plurality of user computing devices attempting to access content from the second web host, wherein individual ones of the first plurality of requests includes an identification of the first web host, wherein individual ones of the second plurality of requests includes an identification of the second web host, wherein the first plurality of requests includes a first request for the first user interface from the first web host, the first request for the first user interface being sent by the first web host in response to the first web host receiving an initial request from a first user computing device of the first plurality of user computing devices to access content from the first web host, the first request for the first user interface including one or more initial parameters that (i) represent the context of the first web host and (ii) include the identification of the first web host, wherein the first web host is different from the first user computing device, and wherein the first web host is separate from the authentication server;

transmitting, from the authentication server and to a content scheduling engine, (i) the one or more initial parameters that include the identification of the first web host, or (ii) one or more additional parameters determined at least in part on the one or more initial parameters such that the one or more additional parameters are based at least in part on the identification of the first web host;

receiving, at the authentication server, a content schedule from the content scheduling engine, the content schedule (1) being based at least in part on the one or more initial parameters or the one or more additional parameters, and (2) specifying which of the maintained context-specific content to populate within the slots of the first user interface; and serving, by the authentication server and to the first user computing device, for display the first user interface with the specified context-specific content in the specified slots, wherein the first user interface comprises a log-in page, the log-in page is served to the first user computing device with corresponding specified context-specific content.

2. One or more non-transitory computer storage media as recited in claim 1, wherein the one or more initial parameters further identify a first user associated with the first user computing device on whose behalf the first web host requests the first user interface, and wherein the displayed first user interface includes content that is customized based at least in part on an identity of the first user.

3. One or more non-transitory computer storage media as recited in claim 1, wherein the context-specific content maintained in the memory further comprises a customized look and feel representing the first web host that requests the first user interface.

4. One or more non-transitory computer storage media as recited in claim 3, wherein the first web host that requests the first user interface provides at least a portion of the context-specific content.

5. One or more non-transitory computer storage media as recited in claim 1, wherein the receiving of the one or more initial parameters comprises receiving an association handle that identifies the first web host making the first request for the first user interface.

6. One or more non-transitory computer storage media as recited in claim 1, wherein the receiving of the one or more initial parameters comprises receiving a marketplace identifier (ID), a page ID, or a slot ID.

7. One or more non-transitory computer storage media as recited in claim 1, wherein the context of the first web host comprises an on-line session between the first user computing device and the first web host.

8. One or more non-transitory computer storage media as recited in claim 1, wherein the acts further comprise determining the one or more additional parameters based at least in part on the one or more initial parameters, and wherein the determining comprises reading a client-to-parameter map to determine the one or more additional parameters mapped to the first web host.

9. One or more non-transitory computer storage media as recited in claim 1, wherein the receiving of the one or more initial parameters comprises receiving a query string uniform resource locator (URL) comprising an association handle identifying the first web host.

10. One or more non-transitory computer storage media as recited in claim 9, wherein the query string URL further comprises a market identifier (ID) or a page ID.

11. One or more non-transitory computer storage media as recited in claim 1, wherein the content scheduling engine comprises a context-to-parameter map for determining the context that maps to the first web host identified by the one or more initial parameters or the one or more additional parameters.

12. One or more non-transitory computer storage media as recited in claim 1, wherein the one or more slots comprise locations on the first user interface for displaying respective pieces of the specified context-specific content.

13. One or more non-transitory computer storage media as recited in claim 12, wherein the locations on the first user interface for displaying the respective pieces of the specified context-specific content are dynamically customized.

14. One or more non-transitory computer storage media as recited in claim 12, wherein at least one of the locations on the first user interface for displaying the respective pieces of the specified context-specific content is statically assigned for receiving a user identifier (ID) and a password.

15. One or more non-transitory computer storage media as recited in claim 12, wherein the receiving of the content schedule from the content scheduling engine comprises receiving a mapping between at least one piece of the specified context-specific content and at least one of the slots of the first user interface.

16. One or more non-transitory computer storage media as recited in claim 12, wherein the receiving of the content schedule from the content scheduling engine comprises receiving a mapping between one or more pieces of the specified context-specific content and respective ones of the slots of the first user interface.

17. One or more non-transitory computer storage media as recited in claim 1, wherein the acts further comprise:
receiving, at the authentication server, a second request for a second user interface from the second web host, the first request for the first user interface being sent by the first web host in response to the first web host receiving a second initial request from a second user computing device to access other content from the second web host, the second request including second one or more initial parameters representing context of the second web host, wherein the second web host is different from the second user computing device, and wherein the second web host is separate from the authentication server;
transmitting, to the content scheduling engine, the second one or more initial parameters or second one or more additional parameters determined at least in part on the second one or more initial parameters;
receiving another content schedule from the content scheduling engine (1) being based at least in part on the second one or more initial parameters or the second one or more additional parameters, and (2) specifying which of the maintained context-specific content to populate within the slots of the second user interface; and serving, by the authentication server and to the second user computing device, for the display the second user interface with the specified context-specific content in the specified slots.

18. One or more non-transitory computer storage media as recited in claim 1, wherein the log-in page includes text fields to receive a user identifier (ID) and a password of a user associated with the first user computing device requesting the first user interface, and wherein the requesting first web host comprises one of multiple different web hosts that request the first user interface comprising the log-in page.

19. One or more non-transitory computer storage media as recited in claim 18, wherein two or more of the multiple different web hosts have a different respective context such that the two or more multiple different web hosts are respectively associated with a customized log-in page comprising different pieces or configurations of the context-specific content in response to requesting the first user interface comprising the log-in page.

20. One or more non-transitory computer storage media as recited in claim 18, wherein the log-in page further comprises a dedicated slot for text fields to receive the user ID and the password.

21. One or more non-transitory computer storage media as recited in claim 1, wherein the first user interface comprises a log-out page that is customized to the requesting web host.

22. One or more non-transitory computer storage media as recited in claim 1, wherein the first user interface comprises time-of-day content that is customized based on a time of day determined in response to receiving the first request for the first user interface.

23. A method comprising:
    receiving, at one or more servers, a request for a user interface from a web host of multiple different web hosts, wherein the request for the user interface is received from the web host in response to the web host receiving an initial request from a user computing device to access a service of the web host, wherein the web host is different from the user computing device, wherein the request for the user interface includes an identity of the requesting web host, and wherein the web host is remote from the one or more servers;
    determining, by at least one server of the one or more servers, which pieces of multiple different pieces of context-specific content maintained at the at least one server to serve to the user computing device as a part of the user interface based at least in part on the identity of the requesting web host; and
    serving the user interface with the determined context-specific content from the one or more servers to the user computing device, wherein the service and the context-specific content that corresponds to the identified one of the multiple different web hosts are provided with the user interface in response to the user computing device requesting the service of the web host.

24. A method as recited in claim 23, further comprising identifying the requesting web host with reference to one or more parameters received from the requesting web host as part of a query string uniform resource locator (URL).

25. A method as recited in claim 23, further comprising identifying the requesting web host with reference to one or more parameters received from the requesting web host, the one or more parameters comprising an association handle, a marketplace identifier (ID), a page ID, or a slot ID.

26. A method as recited in claim 23, wherein the determining of the context-specific content comprises referencing a context-to-parameter map that maps context-specific content to respective ones of the multiple different web hosts.

27. A method as recited in claim 26, wherein the context-to-parameter map further maps the context-specific content to respective slots in the user interface for the respective ones of the multiple different web hosts.

28. A method as recited in claim 23, wherein the user interface comprises a log-in page or a log-out page.

29. A method as recited in claim 23, further comprising locally hosting context-specific hypertext markup language (HTML) code for the web host.

30. A system comprising:
    one or more processors;
    memory accessible by the one or more processors;
    a parameter transmission module, stored in the memory and executable on the one or more processors to transmit a parameter representing a context of a web host to a content scheduling engine, the transmitted parameter including an identity of the web host;
    an input module, stored in the memory and executable on the one or more processors to receive a user interface request from the web host and a content schedule from the content scheduling engine, the user interface request being received from the web host in response to the web hose receiving an initial request from a user computing device to access a service of the web host, and the content schedule specifying content to populate within a user interface based at least in part on the transmitted parameter that includes the identity of the web host; and
    a user interface module, stored in the memory and executable on the one or more processors to serve the user interface that includes the specified content to the user computing device based at least in part on the transmitted parameter, wherein a log-in page from a central authentication server populated with corresponding context-specific content is requested by the web host in response to the user computing device requesting to authenticate with the web host and wherein the web host is different from the user computing device, and wherein the web host is separate from the system.

31. A system as recited in claim 30, wherein the parameter comprises an association handle, a marketplace identifier (ID), a page ID, or a slot ID.

32. A system as recited in claim 30, further comprising context-specific content stored in the memory, the context-specific content being associated with a user associated with the user computing device on whose behalf the web host requests the user interface.

33. A system as recited in claim 30, the content schedule further comprising instructions for the user interface module to cause display of the specified content in a predefined slot of the user interface.

* * * * *